May 10, 1949.  H. J. HOENSELAAR  2,470,078
APPARATUS FOR SLICING HAM ON THE BONE
Filed Sept. 7, 1944
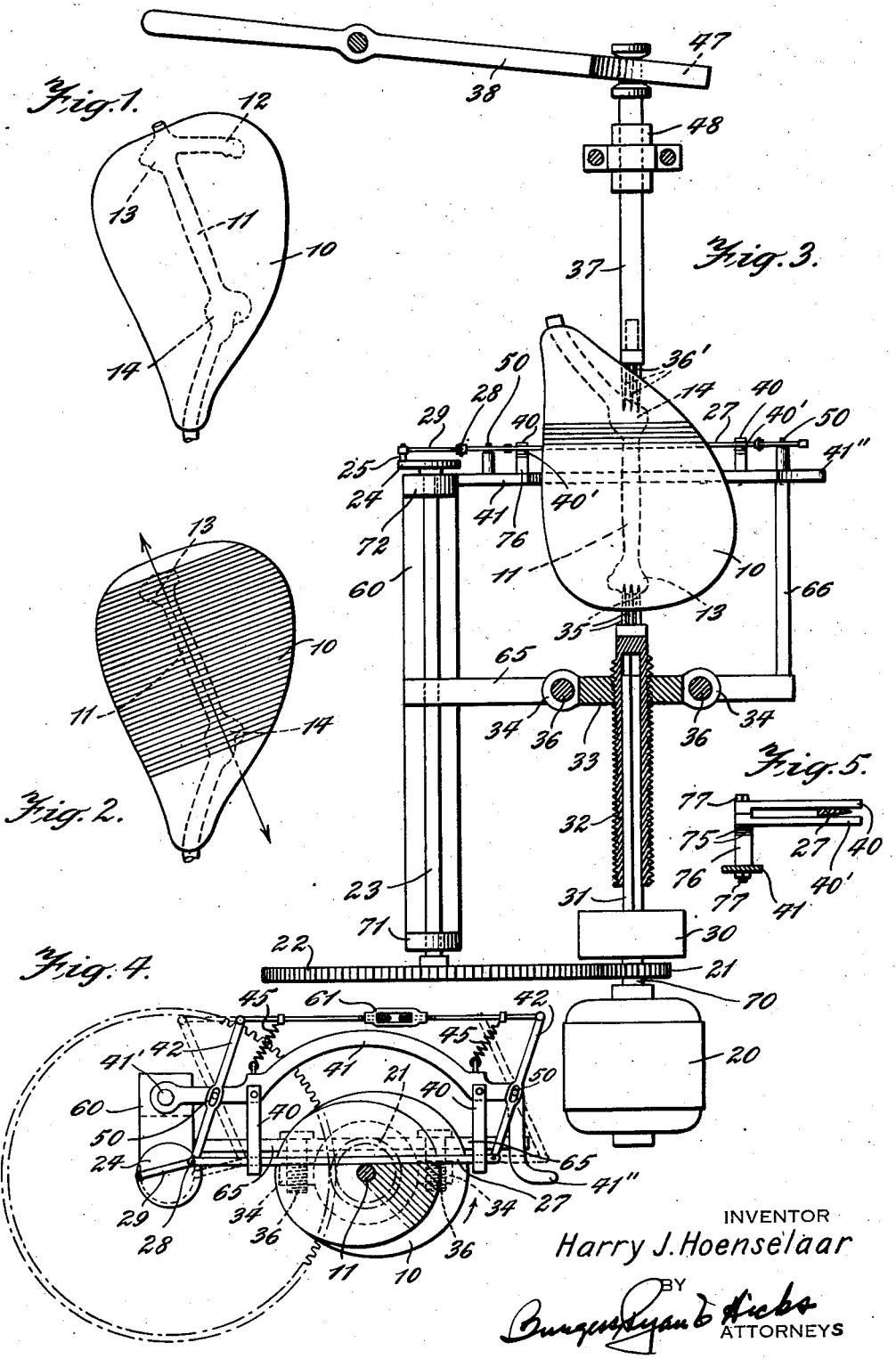
INVENTOR
Harry J. Hoenselaar
BY
ATTORNEYS Patented May 10, 1949

2,470,078

UNITED STATES PATENT OFFICE 2,470,078

APPARATUS FOR SLICING HAM ON THE BONE

Harry J. Hoenselaar, St. Albans, N. Y.

Application September 7, 1944, Serial No. 552,966

2 Claims. (Cl. 146—151)

This invention relates to the slicing of meat, to apparatus for slicing meat, and to hams and other joints of meat in a new form. The invention will be described with particular relation to the slicing of a ham but it will be understood by butchers that there are many other joints of meat which can be sliced with equal facility by this apparatus.

In the meat industry there is a large market for sliced meats, particularly for ham slices, but the bone construction and the shape of a ham is such that no wholly satisfactory method of slicing it exists. This statement also applies to legs of lamb and other like cuts of meat.

It is an object of the invention to provide a method and a machine for slicing ham and other joints, which are of exceptional efficiency in operation. Another object of the invention is to prepare ham for the market in a new and superior form.

The invention contemplates mounting the ham upon its leg bone, turning the ham about its leg bone as an axis, and slicing it as it turns. The invention includes the sliced joints which are produced by this process. The invention also includes the apparatus for accomplishing the process and producing the product.

The objects of the invention as to apparatus are accomplished generally speaking by a machine which has means to grip the ham for rotation about its axis, means to rotate it, means to slice it as it turns, and means whereby the slicing may be made continuous.

In the accompanying drawings, wherein like numerals denote like parts, is diagrammatically shown an apparatus capable of carrying out the process, a ham before slicing, and a ham in the new form. It is to be understood that this apparatus is illustrative, not a limitation.

Fig. 1 is diagrammatic view of a ham showing the leg bone and the aitch bone.

Fig. 2 is a diagrammatic view showing the ham produced by this invention, with the aitch bone removed, and with an arrow showing the axis through the leg bone.

Fig. 3 is a diagrammatic elevational view showing the ham positioned in the slicing machine.

Fig. 4 is a diagrammatic plan view partly in section, of the slicing machine in operation.

Fig. 5 is a detail of the blade guides.

In Fig. 1, a ham 10 has leg bone 11, joints 13, 14 and aitch bone 12. Before the ham is sliced, the aitch bone is preferably removed.

In mounting the ham for rotation about its leg bone as an axis the mounting means are preferably seated in the ends of the leg bone. The mounting means may be retractable and revoluble shafts provided with prongs of sufficient length to penetrate the meat and enter the joints of the leg bone.

Figs. 3 and 4 show a frame having members 60, 65, 66 and 41 which constitute a firm support for the working parts of the apparatus. The element 41 of the supporting frame is bowed medially as shown in Fig. 4 to provide space for the rotation of the ham 10, is pivotally mounted on support 60 by disk-shaped end 41'; and is extended at 41" to form a handle which rests upon and may be fixed to the frame member 66 when the apparatus is in operation. Projecting outwardly from the member 65, as shown in Fig. 4, are two retractable studs 36 upon which the wing nut 33 is removably mounted by means of holes in wings 34, 34. The shaft 32 is mounted in the nut 33 by means of screw threads, and has a sliding fit over the rectangular post 31 which projects from and is driven by the gears in the reduction gear box 30. The motor 20 which is mounted upon a standard motor support, not shown, drives the gears in the gear box 30 through shaft 70.

Above the tubular shaft 32 is a shaft 37 which is revolvably and slidably mounted in guide 48, and at its upper end is rotatably mounted in a slot in the end of lever 38. At the lower end of shaft 37 and at the upper end of shaft 32, as shown in Fig. 3, are prongs 36', and 35 respectively which serve to penetrate the ends of the leg bone of the ham.

The tubular shaft 32 and nut 33 can be removed from the drive shaft 31 by withdrawing the studs 36 from the wings 34 of the nut 33, and sliding the tubular shaft off the drive shaft. The nut and shaft set 32, 33, once withdrawn, may be replaced by another nut and shaft set having a different pitch to the screw threads, so that the rate of advance of the tubular shaft through its cooperating nut may be changed to provide meat slices of selected thickness.

In Fig. 3, the variable speed reversing motor 20 is shown to be operably connected through a pinion gear 21 on shaft 70 with a driven gear 22 mounted on shaft 23 carried in bearings 71, 72 on supporting member 60. On the upper end of the shaft, as seen in Fig. 3, a disk 24 is connected through a stud 25 near its rim and a driving link 29 to end 28 of knife blade 27. The speed of the motor and the ratio of gear teeth in gears 21 and 22 determine the speed at which the disk and stud are rotated and the knife blade is reciprocated.

The knife blade 27 is held under tension by a modified bucksaw turnbuckle mounting. Arms 42, 42 are pivoted at their midpoints by a pin and slot connection 50 to the brace 41 which forms part of the support. The arms 42 carry the blade 27 and the turnbuckle 61 at opposite ends. Adjusting the turnbuckle varies the tension on the blade. By means of the springs 45, 45 enough pressure is applied to the blade to hold the blade yieldingly against the bone during cutting without manual control. The pressure applied to the knife blade can be varied by changing the tension of the springs, or by changing the springs to others of different strength. An operator may control the cutting manually through the pivoted brace 41 and its handle 41". Upper and lower guides 40, 40' which are mounted on the brace 41 serve as bearings for the blade and lend it the support necessary for the cutting of very thin slices.

When cutting single slices the blade 27 may be at right angles to the axis of revolution of the ham, but the blade is more advantageously placed at an angle to the axis of the bone when cutting spiral slices or continuously. This may be accomplished by placing shims of appropriate thickness beneath one pair of the guides 40, 40', as shown in Fig. 5, or by mounting the brace 41 at the selected angle. In Figure 5, 41 is the support, 76 is a sleeve carried thereby, 75 are shims, and 77 is a bolt that holds guides, shims, sleeve, and support in assembled relation.

The ham may be prepared for slicing by removing the aitch bone 12, and mounting the ham in the apparatus. It is not essential but it is preferable to remove the aitch bone. The apparatus is prepared to receive the ham by swinging the brace 41 and knife 27 out of operating position, retracting the mounting shaft 32 by reversing the motor 29, and lifting the shaft 37 by means of the lever 38. The end 13 of the leg bone is seated upon the prongs 35 of the sleeve 32, and shaft 37 is lowered until prongs 36' are seated in the upper end 14 of the leg bone. The apparatus is now ready for slicing. The motor is run until the upper end of the leg bone is about even with the knife, and the knife is swung into operating position. The motor reciprocates the knife, rotates the drive shaft 31, and turns the sleeve 32, which makes its way upward through the screw threads of the nut 33, simultaneously rotating the ham and advancing it past the knife. The shaft 37 rotates freely in guide 48 and slot 47 in the end of the lever 38, and moves upward as the leg bone is raised.

As the cutting progresses the meat is left in place by the blade and at the conclusion of the operation, when the ham has been sliced completely down to the end of the bone 13, the ham still retains its external form but is in a slice which, if carefully unwound, is continuous. The thickness of the slice is determined by the pitch of the threads of elements 32, 33. By changing those elements to similar ones having a different pitch slices of different thickness are produced. In general, cooked hams can be sliced thinner than uncooked hams.

A particularly advantageous part of my invention is in this that a cut ham, or other like joint, is produced in its original external form but in slices still on the bone. After slicing is completed the leg bone may be removed by the packer without disturbing the shape of the ham. The ham may be supported by a winding of cloth or cellophane during the removal of the bone. With or without its bone, the ham may be packed and shipped to market with its form intact but its meat in slices. This has not only a basis of utility but a very great sales appeal, because meat similarly prepared is unknown to the trade.

The invention has other advantages which will be apparent to butchers and to the packing industry.

As many apparently widely different embodiments of this invention may be made without departing from the spirit and scope thereof, it is to be understood that I do not limit myself to the specific embodiments thereof except as defined in the appended claims.

I claim:

1. In a meat slicing machine for slicing a joint of meat having a bone extending longitudinally therein, the combination of: means for mounting the joint upon said bone as an axis about which to revolve the joint, a reciprocating knife for slicing the joint, means for supporting said knife at an angle other than 90° to the axis of the bone to enable a spiral cut to be made in the joint, means for longitudinally reciprocating said knife against the joint, means for tensioning said reciprocating knife against the joint, and means for simultaneously rotating the joint and advancing it past the reciprocating knife as the joint is cut.

2. In a meat slicing machine for slicing a joint of meat having a bone extending longitudinally therein, the combination of: means for mounting the joint upon said bone as an axis about which to revolve the joint, a reciprocating knife for slicing the joint substantially crosswise to said bone, means for supporting said knife at an angle other than 90° to the axis of the bone to enable a spiral cut to be made in the joint, means for longitudinally reciprocating said knife against the joint, and means for coincidently rotating the joint and advancing it, in a direction axially of the bone, past the knife as the joint is cut.

HARRY J. HOENSELAAR.

REFERENCES CITED

The following references are of record in the file of this patent:

UNITED STATES PATENTS

| Number | Name | Date |
|---|---|---|
| 179,193 | Herring | June 27, 1876 |
| 273,418 | Whittemore | Mar. 6, 1883 |
| 405,825 | Boutell | June 25, 1889 |
| 667,364 | Graff | Feb. 5, 1901 |
| 960,334 | Jennings | June 7, 1910 |
| 1,079,778 | Linkiewicz | Nov. 25, 1913 |
| 1,217,717 | Decker et al. | Feb. 27, 1917 |
| 1,281,250 | Ewell | Oct. 8, 1918 |
| 1,403,619 | Pappy | Jan. 17, 1922 |
| 1,772,658 | Black | Aug. 12, 1930 |
| 1,798,038 | Scott et al. | Mar. 24, 1931 |
| 2,090,234 | Robinswitz | Aug. 17, 1937 |
| 2,140,162 | McKee | Dec. 13, 1938 |
| 2,242,451 | Carpenter | May 20, 1941 |
| 2,349,465 | Rupin | May 23, 1944 |

FOREIGN PATENTS

| Number | Country | Date |
|---|---|---|
| 500,457 | Great Britain | Feb. 9, 1939 |